Patented May 12, 1925.

1,537,479

UNITED STATES PATENT OFFICE.

RICHARD C. LORD, OF GAMBIER, OHIO.

METHOD OF MAKING MAGNESIUM CHLORIDE.

No Drawing.   Application filed March 2, 1922. Serial No. 540,588.

*To all whom it may concern:*

Be it known that I, RICHARD C. LORD, a citizen of the United States, and a resident of Gambier, county of Knox, and State of Ohio, have invented certain new and useful Improvements in Methods of Making Magnesium Chloride, of which the following is a specification, the principle of the invention being herein explained, and the best mode in which I have contemplated applying that principle.

The object of the present invention is to provide an improved and economic method or process for making magnesium chloride and other magnesium salts of high purity, by making use of the mother-liquor from the Solvay or ammonia-soda process for soda ash, and dolomite.

In the ammonia-soda process for soda ash it has been the practice to recover the ammonia from the mother liquor containing salt (NaCl), ammonium chloride and ammonium carbonate, by boiling the liquor in a tower or other suitable apparatus until the ammonium carbonate is decomposed, and the mother-liquor contains principally salt and ammonium chloride. To this latter liquor milk of lime is added and the ammonium chloride is converted into calcium chloride with liberation of the gaseous ammonia for re-use in the process. The liquor containing salt and calcium chloride, if to be utilized, is then settled and evaporated till the salt is removed. The remaining calcium chloride liquor is then further treated to produce one of the marketable forms of calcium chloride.

In order to effect a complete recovery of the ammonia, which is essential for the efficiency of the ammonia-soda process, a limestone high in calcium carbonate is desirable, as none of the ingredients except calcium carbonate are utilizable for this purpose. Any magnesium oxid present in the burnt limestone, or lime, will not aid in effecting a complete recovery of the ammonia.

However, I have found that a dolomite, which is a mixture of calcium and magnesium carbonates, occurs abundantly in northwestern Ohio and southeastern Michigan adjoining large ammonia-soda works, in almost molecular proportions, that is the ratio of calcium carbonate to magnesium carbonate is proportional to their molecular or combining weights of $CaCO_3$ 100 and $MgCO_3$ 84 respectively.

Further, in the burning of dolomite to drive off the carbon dioxid, less fuel is required than to burn pure limestone, on account of the lower temperature of decomposition and lower heat of combination of magnesium carbonate than of calcium carbonate. Dolomite will produce a somewhat richer limekiln gas in $CO_2$ than limestone, this gas being an essential gas in the ammonia-soda process as well as in the production of magnesium chloride.

According to my process for producing magnesium chloride, slaked burnt dolomite is added to the mother-liquor instead of and at the point where slaked lime has been added to the present ammonia-soda process. Sufficient slaked burnt dolomite must be added so that there is sufficient free lime or calcium hydroxid to react on all the ammonium chloride and liberate the ammonia therein. If the burnt dolomite contains less magnesium oxid than the molecular ratio to lime of 40 to 56; that is if the ratio of magnesium to calcium carbonate in the original dolomite is less than 84 to 100, a sufficient excess of the slaked burnt dolomite should be added to the mother liquor, while hot, either during the removal of the ammonia or subsequently, so that the ratio of suspended MgO [or $Mg(OH)_2$] to dissolved $CaCl_2$ in the final mother-liquor slurry shall be slightly more than the molecular ratio of 40 to 111.

According to my process, this mother liquor slurry containing salt and calcium chloride in solution and magnesium oxid (or hydroxid) and the impurities from the burnt dolomite in suspension is pumped or run into a tower. The slurry is kept at a temperature preferably between 140° F. and 180° F. in this tower and gas containing $CO_2$ is blown thru this slurry. This gas blowing is continued until the following reaction is complete, the $CO_2$ being absorbed readily by the MgO or $Mg(OH)_2$.

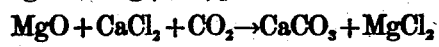
$MgO + CaCl_2 + CO_2 \rightarrow CaCO_3 + MgCl_2$

The reaction will proceed readily to completion with high absorption of the $CO_2$ producing a magnesium chloride liquor containing only faint traces of calcium chloride.

The slurry containing precipitated calcium carbonate is filtered and the filtrate and wash water evaporated to remove the salt (NaCl). After the salt has been removed, the magnesium chloride liquor can be further evaporated to the concentration represented by the formula $MgCl_2 6H_2O$, when it may be drawn off into suitable containers and allowed to solidify. It may also be allowed to crystallize in the needle crystals of the formula $MgCl_2.6H_2O$.

Further if very pure forms of magnesium carbonate or oxid are desired the carbonate of magnesium may be precipitated from the solution of magnesium chloride by addition of sodium carbonate. If pure magnesium oxid is desired, this may be obtained from the magnesium carbonate by calcination.

Previous processes have used gas containing carbon dioxid to convert a solution containing calcium chloride into a solution of magnesium chloride, in the presence of magnesium oxid (or hydroxid), especially that described in patent granted me Sept. 5, 1916, No. 1,197,512. However all such processes required either the filtration of precipitated magnesium oxid (or hydroxid) and the subsequent breaking up of the press cake into a slurry which is a laborious and expensive process; or the presence in the slurry to be treated with gas containing $CO_2$ of a large excess of free lime, requiring additional $CO_2$ gas and producing a heavy precipitate of calcium carbonate in the final slurry, after treatment with gas containing $CO_2$, requiring additional labor of filtration and disposal of the calcium carbonate and producing a weaker solution of magnesium chloride entailing additional expense for evaporation. One of these latter methods was necessary in order that the ratio of MgO to $CaCl_2$ in slurry to be treated with gas containing $CO_2$ might be molecular, or the ratio of 40 to 111.

According to my present process, by use of the mother-liquor of ammonia-soda process and slaked burnt dolomite, I obtain in a simple manner slurry containing only magnesium oxid (or hydroxid) with slight impurities in suspension and calcium chloride in solution in the necessary molecular proportion, with no operation requiring additional labor or fuel for the production of the above mentioned slurry, beyond a necessary step of the ammonia-soda process.

Other methods of applying the principle of my invention may be employed instead of the one explained, change being made as regards the process herein disclosed, provided the step or steps stated by any one of the following claims or the equivalent of such stated step or steps be employed.

I claim:

1. A process of making magnesium chloride which consists in treating the ammonium chloride mother-liquor of the ammonia-soda process with dolomitic lime so that the calcium oxid (or hydroxid) added will be sufficient to react quantitatively with the ammonium chloride in the liquor; expelling the liberated ammonia; treating the slurry so formed with gas containing carbon dioxid, until the magnesium oxid (or hydroxid) is converted into magnesium chloride, filtering off the precipitated calcium carbonate and evaporating the liquor with removal of the salt (NaCl) to a solid magnesium chloride.

2. A process of making magnesium chloride liquor which consists in treating a solution containing ammonium chloride with dolomitic lime, so that the calcium oxid (or hydroxid) added will be sufficient to react quantitatively with the ammonium chloride in the liquor; expelling the liberated ammonia and forming calcium chloride in solution; treating the slurry so formed with gas containing carbon dioxid until the calcium chloride is converted into magnesium chloride and filtering off the precipitated calcium carbonate.

3. A process for obtaining a slurry containing calcium chloride in solution and magnesium oxid (or hydroxid) in suspension in approximately equal molecular proportions, consisting of treating a solution of ammonium chloride with slaked burnt dolomite so that the calcium hydroxid added will be sufficient to react quantitatively with the ammonium chloride in the liquor; and expelling the liberated ammonia.

4. In a process for making magnesium chloride, the combination of treating the ammonium chloride liquor of the ammonia-soda process with slaked burnt dolomite so that the calcium oxid (or hydroxid) added will be sufficient to react quantitatively with the ammonium chloride in the liquor; liberating and expelling the ammonia, and forming a slurry containing calcium chloride in solution and magnesium oxid (or hydroxid) in suspension in approximate molecular ratio and the subsequent treatment of this slurry with gas containing $CO_2$ to produce magnesium chloride.

Signed by me this 25th day of February, 1922.

RICHARD C. LORD.

Witnesses:
 KATHERINE T. LORD,
 JOHN B. DOWNING.